United States Patent [19]

White

[11] 3,875,256

[45] Apr. 1, 1975

[54] BIS(POLYPHENYLENE)-CARBONATE BLOCK COPOLYMERS

[75] Inventor: Dwain M. White, Schenectady, N.Y.

[73] Assignee: General Electric Company, Schenectady, N.Y.

[22] Filed: July 30, 1973

[21] Appl. No.: 383,998

Related U.S. Application Data

[60] Continuation-in-part of Ser. No. 222,987, Feb. 2, 1972, Pat. No. 3,770,699, and a continuation-in-part of Ser. No. 222,988, Feb. 2, 1972, Pat. No. 3,770,850, each Division of Ser. No. 817.

[52] U.S. Cl. ................................. 260/860
[51] Int. Cl. ............................. C08g 39/10
[58] Field of Search .............. 260/860, 47 C, 77.5 D

[56] References Cited
UNITED STATES PATENTS 3,342,892  9/1967  Laakso ................................ 260/860

*Primary Examiner*—Melvin Goldstein
*Assistant Examiner*—T. Pertilla
*Attorney, Agent, or Firm*—F. Wesley Turner; Joseph T. Cohen; Jerome C. Squillaro

[57] ABSTRACT

The invention relates to block copolymers of the A-B-A type where each A is the phenoxy residue of a poly(2,6-disubstituted-1,4-phenylene oxide) having one terminal hydroxyl per polymer molecule and B is the residue of a carbonate precursor having two groups which are reactive with the hydroxyl group of said poly(phenylene oxide). These compositions are useful in producing molded articles, films, fibers, etc., having modified properties compared to the parent poly(phenylene oxides).

20 Claims, No Drawings

BIS(POLYPHENYLENE)-CARBONATE BLOCK COPOLYMERS

This application is a continuation-in-part of my divisional applications, Ser. Nos. 222,987 and 222,988, both filed Feb. 2, 1972, now U.S. Pat. Nos. 3,770,699 and 3,770,850, respectively, as divisions of my then copending application Ser. No. 817, now U.S. Pat. No. 3,703,564, filed Jan. 5, 1970.

This invention relates to block copolymers of the A-B-A type where each A is the phenoxy residue of a poly(2,6-disubstituted-1,4-phenylene oxide) having one terminal hydroxyl group per polymer molecule and B is the residue of a carbonate precursor having two groups which are reactive with the hydroxyl group of the poly(phenylene oxide). More specifically, the substituents of the poly(phenylene oxide) are methyl or phenyl, i.e., the poly(phenylene oxides) are poly(2,6-dimethyl-1,4-phenylene oxide), poly(2-methyl-6-phenyl-1,4-phenylene oxide), poly(2,6-diphenyl-1,4-phenylene oxide) and copolymers wherein the repeating units are mixtures of said poly(phenylene oxides). The carbonate precursors having two groups reactive with the hydroxyl group of the poly(phenylene oxides) can be either simple organic compounds, e.g., a carbonyl halide or bis-haloformate, preferally phosgene or a bis-chloroformate, or they can be the polymeric reaction products of these compounds with simple dihydroxy compounds which are so reacted that the two terminal groups of the polymer are each haloformate, preferably chloroformate which are reactive with the hydroxyl group of the poly(phenylene oxide). It is thus seen that each B unit is bifunctional and couples two monofunctional A units together to form a block copolymer which can be considered a polymeric end-capped poly(phenylene oxide).

Poly(phenylene oxides), sometimes known as polyphenylene oxides or polyphenylene ethers, as a general class, are an extremely interesting group of new polymers. These polymers, both homopolymers and copolymers, and processes of producing them are disclosed in U.S. Pat. Nos. 3,306,874, 3,306,875 and 3,432,466, all in the name of Allan S. Hay and assigned to the same assignee as the present invention. These patents are hereby incorporated by reference. These poly(phenylene oxides) have many desirable properties and have found wide commercial acceptance. Generally, these poly(phenylene oxides) are poly(2,6-disubstituted-1,4-phenylene oxides) which are made by oxidative coupling of 2,6-disubstituted phenols. The most readily available phenols are 2,6-dimethylphenol, 2-methyl-6-phenylphenol and 2,6-diphenylphenol. Therefore, the most readily available polymers are the poly(phenylene oxides) corresponding to these phenols.

In general, the poly(phenylene oxides) should have an average degree of polymerization sufficiently high that the number average molecular weight of the polymer is at least 10,000. For a given average degree of polymerization, the number average molecular weight will of course vary depending on the molecular weight of the particular phenoxy repeating unit making up the polyphenylene oxide. Since the physical properties are more dependent on the average degree of polymerization than the particular value of the molecular weight, the average degree of polymerization should be no less than 75 and preferably at least 100. However, the polymer's physical properties improve as the degree of polymerization increases above these values.

In the oxidative coupling reaction of phenols to produce poly(phenylene oxides), a phenolic hydroxyl group is present on one end of each polymer molecule up to the point where the polymers have an average degree of polymerization of about 75 – 85. As the coupling reaction is continued, to produce higher molecule weight polymer, a secondary reaction, the mechanism which is yet unknown, causes some of these terminal hydroxyl groups to disappear. This reaction is most noticeable for the polymers made from phenols having two alkyl substituents and least noticeable for the polymers made from phenols having two aryl substituents. The disappearance of hydroxyl groups with increase in degree of polymerization is gradual. Even with poly(2,6-dimethyl-1,4-phenylene oxide), the decrease is only to an average of 0.9 hydroxyl groups per polymer molecule at an average degree of polymerization of about 160 – 170, and to about 0.7 in the range of 290 – 300 and to about 0.4 in the range of 900 –925. These values are obtained only if very pure 2,6-dimethylphenol is used. The rate of hydroxyl disappearance increases as the purity of starting phenol decreases. Other secondary reactions also occur which produce color in the polymer, i.e., chromophores or chromophoreengendering bodies (causing color to be developed later, for example, when heated) which can be due to amines and/or diphenoquinones sorbed or incorporated in the polymer molecule, carbonyl groups on the polymer molecule, etc. These reactions appear to be due to or are greatly accentuated by the type and amounts of impurities in the starting phenol.

Generally, chromophores and chromophore-engendering bodies are undesirable in the polymer unless the particular color is desired. Hydroxyl, amino and carbonyl groups generally contribute to thermal degradation of the polymer when exposed to high temperature. Therefore, it would be particularly desirable to eliminate these substituents in order to improve both the color and stability of the poly(phenylene oxides). Furthermore, it is sometimes desirable to modify the flow properties, the solubility characteristics or other properties of the polymer.

Using the purest starting phenol possible, the amount of nitrogen incorporated in the polymer is below the detectable limit of 20 p.p.m. up to an average degree of polymerization of about 140 – 150. However, the amount of nitrogen is about 30 p.p.m at an average degree of polymerization of about 175 – 185 and about 45 p.p.m. at an average degree of polymerization of about 290 – 300. As mentioned above, the loss in properties associated with the decrease in hydroxyl group is not so evident in the polymers from 2-methyl-6-phenylphenol and 2,6-diphenylphenol as it is with the polymers from 2,6-dimethylphenol. However, the incorporation of amine in the polymer or copolymers is a problem with all three phenols.

It would be highly desirable to obtain poly(phenylene oxides) having the structural regularity of the head-to-tail configuration as evidence by one hydroxyl group per polymer molecule as well as having extremely low concentration of nitrogen and color-producing bodies. To attain this, the degree of polymerization should be no more than 170 and preferably even no more than about 100. Even then, it is necessary to use extremely pure starting phenol and to use the extremely active catalyst system taught by Hay, i.e., a mixture of tertiary diamine and a tertiary monoamine, otherwise, even polymers having a lower degree of polymerization will have the above discussed defects. It is evident that these type of polymers since they have such a low degree of polymerization do not have as desirable physical properties as the polymers having a higher degree of polymerization. It would be highly desirable to be able to have a polymer which had the structural regularity and other desirable properties possessed by these polymers having the lower degree of polymerization discussed above combined with the much better mechanical and physical properties of the polymers having the higher degree of polymerization.

I have discovered that this can be readily accomplished by forming an A-B-A type block copolymer where the A units are the phenoxy residue of these head-to-tail poly(phenylene oxides) joined together by the B units which are the residue of a bifunctional compound, where the functionality is due to the presence of two groups which are reactive with the phenolic hydroxyl group of the poly(phenylene oxide). This bifunctional compound can be a simple chemical compound such as a diacyl halide for example, the diacyl halides of both aliphatic and aromatic dicarboxylic acids as disclosed and claimed in my U.S. Pat. No. 3,703,564. A diisocyanate, as disclosed in my divisional application, Ser. No. 222,988, U.S. Pat. No. 3,770,850 a bis(haloaryl) sulfone, as disclosed in my divisional application, Ser. No. 222,987, U.S. Pat. No. 3,770,699 etc., which are hereby incorporated by reference, or, as disclosed and claimed herein, it can be a carbon halide or a bis-haloformate of a dihydric phenol or alcohol. The molecular weights of these compounds are so small, compared to the molecular weight of the poly(phenylene oxide), that the use of these reagents as couplers results in essentially doubling the degree of polymerization of the starting poly(phenylene oxide) when using the most ideal conditions. Generally, the exact stoichiometry needed to obtain this doubling is not possible to obtain readily and a doubling of the degree of polymerization is approached rather than obtained in a direct relationship with the accuracy of the stoichiometry.

Since increasing the chain length of the aliphatic moiety or the complexity of the ring system of the aromatic moiety of these coupling reagents would have relatively minor effect on the properties or the total molecular weight of the resulting block copolymer and are not as readily available, I prefer that the aliphatic moiety have from 1 to 8 carbon atoms and be saturated, and that the aromatic moiety be of the benzene series. The latter can have from one up to the total number of its hydrogen atoms replaced with $C_{1-8}$ alkyl or halogen substituents and two benzene nuclei can be joined together with a simple valence, or alkylene, alkylidene, oxygen, sulfonyl, etc., group.

In the case of the carbonyl halides and bis-haloformates, the halogen is displaced and does not form part of the polymer. Since the chloride is very reactive and cheap, it is the halogen generally used, i.e., phosgene or a bis-chloroformate, but the corresponding bromides, iodides or fluorides can be used if desired, i.e., the carbonyl bromide, carbonyl iodide, carbonyl fluoride, carbonyl chlorofuoride, etc., and the corresponding bis-haloformates made by reacting one or more dihydric phenols or dihydric alcohols with one or more of the above carbonyl halides. As described later the esters of the bis-haloformates can be used in place of the bis-haloformates. The particular halide used is not critical and forms no part of this invention.

Typical examples of the simple bifunctional compounds I prefer to use as the coupling agent are the carbonyl halides having the formula

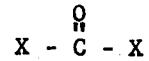

or the bis-haloformates having the formula

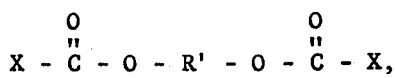

where X is halogen, e.g., fluorine, chlorine, bromine or iodine, but preferably chlorine. R' is $C_{2-8}$ alkylene, e.g., ethylene, propylene, isopropylene, the various butylenes, the various pentylenes, the various hexylenes (including cyclohexylenes), the various heptylenes, the various octylenes, phenylene, biphenylene, i.e.,

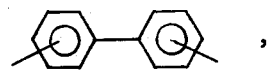

e.g., 2,2'-, 2,3'-, 2,4'-, 3,3'-, 3,4'- and 4,4'-biphenylene; bis(phenylene)-$C_{1-8}$ alkane, i.e.,

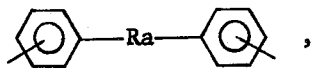

where Ra is $C_{1-8}$ alkylene or alkylidene, e.g., methylene, ethylidene, isopropylidene, butylidene, etc. and the various other examples given above for R'; biphenylene oxide, i.e.,

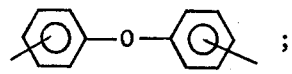

poly($C_{2-8}$ oxyalkylene), having an average of 2 to 10 repeating units, i.e., $-(R_b - O)_{\overline{p}}$ where p is 2 – 10 and $R_b$ is alkylene, examples of which are given above for R', and the above mentioned groups containing a phenylene or biphenylene group, e.g., the various phenylenes, biphenylenes, bis(phenylene)-$C_{1-8}$ alkanes, and (biphenylene) oxides, wherein one up to the total number of aromatic hydrogens have been replaced with halogen, preferably chlorine, and/or $C_{1-8}$ groups.

Bis-haloformates of simple dihydric alcohols or dihydric phenols are difficult to prepare without simultaneously producing some of the polymeric polycarbonate containing two haloformate end groups. This generally is not undesirable insofar as producing my block copolymers is concerned. However, where it is desired to make a dicarbonate coupled block copolymer free of any polycarbonate, two procedures can be used. In the first procedure, one first forms a haloformate of either a monohydric alcohol or a monohydric phenol and then reacts this monohaloformate with the desired dihydric alcohol or dihydric phenol to form an intermediate bis(carbonate ester). This ester can be used as the coupling agent in an ester-exchange reaction, as is well known in art, to displace the monohydric alcohol or monohydric phenol with the desired poly(phenylene oxide). Since the monohydric alcohol or the monohydric phenol will not become part of the polymer molecule, it is preferable to use a simple, low molecular weight, readily available alcohol or phenol for example methanol, ethanol, etc. or phenol, a cresol, xylenol, etc., to first react with the carbonyl halide, preferably phosgene, since phosgene is the most readily available and the cheapest of the carbonyl halides. The chlorocarbonate ester so produced is then reacted with any of the dihydric alcohols or dihydric phenols, examples of which will be given later with reference to the various polymeric couplers for forming the block copolymers of this invention, to produce the bis-ester coupling agent.

In the second procedure, from 50 to 100 percent excess of the stoichiometric amount, based on the amount of dihydric reactant, i.e., dihydric alcohol or phenol, of the carbonyl halide, is dissolved in a non-reactive solvent, preferably methylene chloride, followed by dissolution of the dihydric reactant. While maintained at ambient temperature, tertiary amine, preferably pyridine, is added dropwise. As the reaction proceeds some of the pyridine hydrohalide precipitates. The solvent and excess carbonyl halide are evaporated in a dry stream of inert gas, and the bis-haloformate product separated from the pyridine hydrohalide by dissolution in anhydrous benzene and filtering. Evaporation of the benzene under vacuum leaves the desired bis-haloformate which must be protected from moisture.

A variation of the first procedure is to use the poly(phenylene oxide) as the monohydric phenol to form a polymeric haloformate, two molecules of which are then coupled together with one molecule of a dihydric alcohol or dihydric phenol.

Where still higher degrees of polymerization are desired in the final product than can be obtained with the above-described simple coupling agents, the coupling reagents used to produce the B units in the block copolymer can themselves be polymeric products obtained by reacting the simple types of compounds discussed above with dihydric alcohols or phenols to form polymers wherein the haloformate group is still the terminal group on both ends of the polymer molecule.

For example, the carbonyl halide or bis-haloformate can be reacted with either a dihydric alcohol or a dihydric phenol to produce a polycarbonate. When the amount of carbonyl halide or bis-haloformate exceeds the stoichiometric amount required to react with the dihydric compound, the polymer so produced will have haloformate groups on both ends of the polymer chains. The degree of polymerization of the resulting polymer will decrease as the excess amount increases. If such reactive end-group terminated polymers have an average degree of polymerization no greater than approximately 20, these end-groups are almost as easily reacted with the phenolic hydroxyl groups of the poly(phenylene oxides) as the same reactive groups in the simple compounds.

A variation of this procedure is to react an excess of a bis-haloformate of a simple dihydric alcohol or phenol with the poly(phenylene oxide) so that the latter has a haloformate end group. A dihydric alcohol or dihydric phenol is then added which reacts both with the excess bishaloformate to form low molecular weight polymer and with some of the haloformate groups now on the poly(phenylene oxide). The net result is the coupling of two molecules of the poly(phenylene oxide) with one molecule of the polycarbonate.

When it is desired to use these polymeric coupling compounds, they are generally polymers of the simpler dihydric compounds for example, the lower alkylene glycols having from 2 to 8 carbon atoms, the dihydroxy terminated polyoxyalkylene ethers having an average number of repeating units of 2 to 10 and the alkylene group having from 2 to 8 carbon atoms or they are simple dihydric phenols, either the dihydric phenols of the benzene series, for example hydroquinone, resorcinol, etc., biphenols of the benzene series, for example dihydroxybiphenyls, etc. or bisphenols of the benzene series which are either bis(hydroxyphenyl) alkanes wherein the alkane moiety has from 1 to 8 carbon atoms or bis(-hydroxyphenyl) oxides (or ethers), or the above compounds which contain either a phenylene or biphenylene group wherein from one up to the total number of hydrogens on the aryl rings are replaced by $C_{1-8}$ alkyl or halogen groups.

Specific examples of such dihydric alcohols and phenols are: the alkylene glycols, e.g., ethylene glycol, 1,2- and 1,3-propanediol, the various isomeric butanediols, the various isomeric pentanediols, the various isomeric hexanediols, including the cylcohexanediols or dihydroxycyclohexanes, the isomeric heptanediols, the isomeric octanediols, the poly(oxyalkylene) glycols, e.g., triethyleneglycol, dipropylene glycol, tetraethylene glycol, etc. Poly(oxyalkylene) glycols having a higher degree of polymerization for example, pentapropylene glycol, decaethylene glycol, etc., are usually prepared by polymerization of the appropriate alkylene oxide and are mixtures of the desired glycols whose average degree of polymerization can be obtained in the desired range.

The following are examples of phenols of the benzene series, including, biphenols, bisphenols, and the halo and alkyl substituted derivatives thereof: hydroquinone, resorcinol, catechol, 1,2-dihydroxy-4-chlorobenzene, 1,4-dihydroxy-2-chlorobenzene, 1,2-dihydroxy-3,5-dichlorobenzene, 1,2-dihydroxy-4-bromobenzene, 1,3-dihydroxy-2,4,6-trichlorobenzene, 1,3-dihydroxy-2-chloro-4,6-dibromobenzene, 1,4-dihydroxy-2,3-dichlorobenzene, 1,2-dihydroxy-4-methylbenzene, 1,3-dihydroxy-4-methylbenzene, 2,5-dihydroxy-3-chlorotoluene, tetrachlorohydroquinone, 1,4-dihydroxy-2-ethylbenzene, 1,3-dihydroxy-2,4-dimethylbenzene, 1,4-dihydroxy-2,6-dimethyl-3,5-dichlorobenzene, 1,4-dihydroxy-2-methyl-5-n-propylbenzene, 1,4-dihydroxy-3-isopropyl-5-chloro-6-methylbenzene, etc., 2,2'-dihydroxydiphenyl, 2,4'-dihydroxydiphenyl, 4,4'-dihydroxydiphenyl, 4,4'-dihydroxy-3,3'-diethyldiphenyl, 3-chloro-4,4'-dihydroxydiphenyl, 3,3',5,5'-tetrachloro-4,4'-dihydroxydiphenyl, 3,3',5,5'-tetrabromo-4,4'-dihydroxydiphenyl, 4,4'-dihydroxydiphenyl ether, the 3,4'-, 2,4'-, 3,3'-, 2,2'-, 2,3'-, etc. dihydroxydiphenyl ethers, 4,4'-dihydroxy-2,6-dimethyldiphenyl ether, 4,4'-dihydroxy-2,5-dimethyldiphenyl ether, 4,4'-dihydroxy-3,3'-di-isobutyldiphenyl ether, 4,4'-dihydroxy-3,3'-diisopropyldiphenyl ether, 4,4'-dihydroxy-3,3'-dichlorodiphenyl ether, 4,4'-dihydroxy-3,3'-difluorodiphenyl ether, 4,4'-dihydroxy-2,3'-dibromodiphenyl ether, 2,4'-dihydroxytetraphenyl ether, 4,4'-dihydroxytriphenyl ether, 2,4'-dihydroxydiphenylmethane, bis(2-hydroxyphenyl)methane, bis(4-hydroxyphenyl)methane, bis(3,5-dichloro-4-hydroxyphenyl)methane, bis(4-hydroxy-2,6-dimethylphenyl)methane, bis(2-hydroxy-4,6-dimethylphenyl)-methane, 1,1-bis(4-hydroxyphenyl)ethane, 1,2-bis(4-hydroxyphenyl)ethane, 2,2-bis(4-hydroxyphenyl)propane, 1,1-bis(4-hydroxyphenyl)heptane, 4,4-bis(4-hydroxyphenyl)heptane, etc.

From what has been said above, it is evident that the block copolymers of this invention can best be described as having the formula

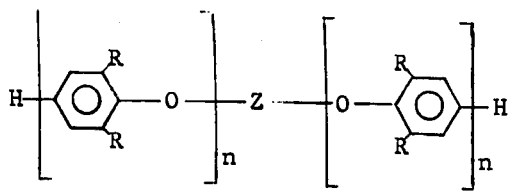

where each R is independently selected from the group consisting of methyl and phenyl and n is the average number of repeating units and is in the range of 40 to 170, and Z is a divalent segmer having the formula

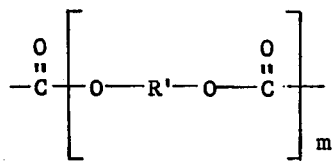

where R' is $C_{2-8}$ alkylene, phenylene, biphenylene, bis(phenylene)-$C_{1-8}$ alkane, bis(phenylene) oxide, poly($C_{2-8}$-oxyalkylene) having an average number of repeating units of from 2 to 10 and the aformentioned groups containing a phenylene or biphenylene group wherein from 1 up to the total number of hydrogens on the aryl rings are replaced by $C_{1-8}$ alkyl or halogen, and m represents the number of repeating units and is in the range of from 0 to 20. It is evident that when m is 0 to 1 that the simple difunctional compounds discussed above have been used as the coupling reagent and when m is 2 to 20 that the polymeric compounds having an average degree of polymerization of m have been used as the coupling agent.

The reaction between the poly(phenylene oxide) and the carbonyl halide or bis-haloformate can be effected in a wide variety of ways, dependent on the desires of the operator. Although not essential, it is preferable to carry out the reaction in a solvent in which both the reactants and the block copolymer product are soluble. In those reactions where a hydrogen halide is produced by the reaction of the hydroxyl group of the poly(phenylene oxide) and the carbonyl halide or bis-haloformate, the reaction is promoted by the use of a hydrogen halide acceptor in the reaction mixture. Such a hydrohalide acceptor may be an alkali metal hydroxide, an alkaline earth metal hydroxide or oxide or a tertiary amine.

If desired, an alkali metal salt of the poly(phenylene oxide) can be made, using an alkali metal adduct of a diaryl ketone, by the method disclosed and claimed in Hay, U.S. Pat. No. 3,402,143. Alternatively, the alkali metal adduct of triphenyl methane can be used as described by House and Kramer in J. Org. Chem. 27,4147 (1962). In these reactions, the adduct which is highly colored, is used to titrate the solution of the poly(phenylene oxide) until the deep color of the adduct persists. Knowing the titer of the alkali metal adduct, the stoichiometric proportions of the poly(phenylene oxide) and the difunctional coupling agent are readily determined.

The reactions are generally carried out at room temperature although heating will speed the reaction. Temperatures up to the reflux temperature of the reaction mixture at the ambient pressure can be used. Generally, there is no advantage to using superatmospheric pressure, although it can be used if desired to obtain a higher reflux temperature provided in those reactions where a hydrogen halide is found, the venting of this gas does not present any problem.

The general conditions required for the reaction of the hydroxyl group, or its alkali metal salt, of the poly(phenylene oxide) and the reactive group of the carbonyl halide, the bis-haloformate or the corresponding esters of the latter, involves reaction conditions which are well known to those skilled in the art giving due consideration to the particular reaction involved in making a particular block copolymer. When not using an alkali metal salt of the poly(phenylene oxide), I have found that best results are obtained by using very concentrated solutions of very strong bases, e.g., sodium or potassium hydroxide, as the hydrohalide acceptor. These strong bases promote an equilibration reaction between the poly(phenylene oxide) and the phenoxide ion of the poly(phenylene oxide). The phenoxide ion is much more reactive than the un-ionized OH and aids especially in the reaction with the second halogen of the carbonyl halide, i.e., the haloformate reaction. Best results are obtained by very slow, preferably dropwise, addition of the carbonyl halide when it is used as the coupling agent. This permits time for additional phenoxide ion to form as it is used up and minimizes hydrolysis, especially of the chloroformate. Still further improvement in results are obtained when bishaloformates are used as the coupling agents, by using a phase transfer agent. One which is commercially available and very satisfactory as tricaprylyl monomethyl ammonium chloride, hereinafter designated as TMAC. The particular reaction conditions used are not critical to the preparation of my block copolymers, and form no part of this invention.

In order that those skilled in the art may readily understand my invention, the following examples are given by way of illustration and not by way of limitation. In all of the examples, parts and percentages are by weight, temperatures are given in degress centigrade and intrinsic viscosities are determined in chloroform at 25°C and given in deciliters per gram, unless stated otherwise.

In general the poly(phenylene oxides) in the following examples were prepared by the methods disclosed in the above-referenced Hay, U.S. patents. The particular times and temperatures to obtain a particular viscosity can vary somewhat depending upon the purity of the reagents. If under a particular set of reaction conditions, particular batches of reagents lead to a higher intrinsic viscosity than desired, a shorter reaction time will correct this. Conversely, a longer reaction time will give higher intrinsic viscosity. As mentioned above, poly(2,6-dimethyl-1,4-phenylene oxide) is more subject to disappearance of the hydroxyl group for a particular molecular weight or degree of polymerization than are the other two poly(phenylene oxides) of this invention. Example 1, therefore, is given to illustrate the preparation of this polymer from 2,6-dimethylphenol.

EXAMPLE 1

A commercially available 2,6-dimethylphenol having a purity of 99+ percent was still further purified to a purity of 99.9 percent by fractional distillation and two fractional recrystallizations. Three reactions were run, each for a different length of time. In each case, oxygen was bubbled through a stirred mixture of 1.0 g. of cuprous chloride, 1.5 ml. of N,N,N',N'-tetramethylethylenediamine, 4.72 g. of trimethylamine which had previously been dissolved in 45 ml. of toluene, 50 g. of anhydrous magnesium sulfate and 1230 ml. of benzene at 25°. After the cuprous chloride was dissolved, 100 g. of the highly purified 2,6-dimethylphenol was added. The reaction mixture was cooled with a water bath at room temperature so that the maximum reaction temperature did not exceed 35°. After the desired time, the reaction was stopped by the addition of 25 ml. of concentrated aqueous hydrochloric acid. After removal of the magnesium sulfate, the reaction mixture was poured into an excess of methanol to precipitate the polymer which was well washed with water. The results are shown in Table I.

TABLE I

| Reaction time minutes | Intrinsic viscosity dl/g. | Hydroxyls/ polymer molecule | Nitrogen p.p.m |
|---|---|---|---|
| 19.5 | 0.32 | 1.0 | 20 |
| 23 | 0.48 | .9 | 20 |
| 27 | 0.55 | .9 | 30 |

EXAMPLE 2

This Example shows the coupling of a poly(phenylene oxide) with a carbonyl halide. Two drops of a 50 percent aqueous sodium hydroxide solution containing 76 mg. of sodium hydroxide, were added to a 30 percent w/v solution of 2.0 g. of poly(2,6-dimethyl-1,4-phenylene oxide) in chlorobenzene at 25° under nitrogen. After stirring for 30 minutes, 0.65 ml. of a 6.8 percent w/v solution of phosgene in chlorobenzene was added dropwise. After 30 minutes, about 100 ml. of methanol was added to precipitate the polymer which was removed by filtration, washed with methanol and dried. The block copolymer product weighed 1.9 g. and had an intrinsic viscosity of 0.49 compared to 0.30 for the starting poly(phenylene oxide).

EXAMPLE 3

This Example illustrates coupling of a poly(phenylene oxide) with a bis-haloformate of a simple dihydric phenol. One drop of a 50 percent aqueous sodium hydroxide solution containing 38 mg. of sodium hydroxide and 0.10 ml. of a 10 percent solution of tricaprylyl monomethyl ammonium chloride (TMAC) in chlorobenzene were added to a solution of 2.0 g. of poly(2,6-dimethyl-1,4-phenylene oxide) in 6.7 ml. of chlorobenzene. After stirring for 30 minutes at 25° under nitrogen, 0.0318 g. of the bis-chloroformate of 4,4'-isopropylidenediphenol (bisphenol-A) was added with stirring. After 30 minutes, methanol was added dropwise until no more polymer precipitated. After removal by filtration, washing with methanol and drying, the block copolymer product weighed 1.9 g. and had an intrinsic viscosity of 0.39 compared to 0.30 for the starting poly(phenylene oxide).

EXAMPLE 4

This Example is a variation of Example 3, and shows the coupling of a haloformate terminated poly(phenylene oxide) with a dihydric phenol. Under nitrogen at 25°, 0.52 ml. of a 17 percent solution of phosgene in chlorobenzene was added to 6.7 ml. of chlorobenzene containing 0.15 ml. of pyridine and 2.0 g. of poly(2,6-dimethyl-1,4-phenylene oxide) having an intrinsic viscosity of 0.30. After completion of the reaction, nitrogen was blown through the solution to entrain excess phosgene. When moist litmus paper showed no acidic gases in the exiting nitrogen, 0.014 g. of 4,4'-isopropylidenediphenol was added with stirring. After 30 minutes, the polymer was isolated, washed and dried, as described above to give 2.0 g. of a block copolymer having an intrinsic viscosity of 0.37. During the initial reaction with the phosgene an increase in viscosity of the solution was noted. Sampling at this point showed the intrinsic viscosity of the polymer had increased to 0.32 indicating that a small amount of the phosgene had acted as a coupling reagent to form the block copolymer with the poly(phenylene oxide) but most had reacted to form the chloroformate which was then coupled with the dihydric phenol.

EXAMPLE 5

This Example illustrates the use of a polymeric bis-chloroformate coupling reagent, i.e., a low molecular weight polycarbonate whose two end groups are each a chloroformate group. This coupling reagent was prepared by adding 20 g. of phosgene to 40 ml. of pyridine and 125 ml. of methylene chloride in a 500 ml. 3-neck flask equipped with gas inlet tube, condenser, stirrer and dropping funnel, under a nitrogen atmosphere. This caused a solid, complex of pyridine and phosgene to form. A solution of 20 g. of 4,4'-isopropylidenediphenol in 15 ml. of pyridine and 30 ml. of chloroform was added dropwise while additional phosgene was introduced to maintain an excess in the reaction mixture. After stirring overnight, nitrogen was bubbled through to sparge unreacted phosgene. Analysis showed 0.25 meq. of active Cl per ml. of solution, which correspondes to a number average molecular weight of about 900, i.e., the average number of repeating units is between 3 and 4.

The above polycarbonate having haloformate end groups was used to couple a poly(phenylene oxide). A solution in 35 ml. of benzene of 2.5 g. of poly(2,6-dimethyl-1,4-phenylene oxide) having an intrinsic viscosity of 0.30 was dehydrated by distilling 10 ml. of benzene as an azeotrope with any water in the solution. The poly(phenylene oxide) was converted to its potassium salt by titrating the solution of the polymer with a one molar solution of triphenylmethyl potassium in 1,2-dimethoxyethane, prepared by the method disclosed by House and Kramer in Journal of Organic Chemistry, 27, 4147 (1962) until the deep red color of the titrant persisted. To this reagent, 1.0 ml. of the above-described polymeric bis-chloroformate coupling reagent solution was added and the mixture was stirred overnight. The polymer was isolated by precipitation with methanol, filtering, washing with methanol and drying. The yield was 2.4 g. of the block copolymer having an intrinsic viscosity of 0.39.

A variation of this coupling reaction was run whereby a solution of 6.7 ml. of chlorobenzene of 2.0 g. of poly-(2,6-dimethyl-1,4-phenylene oxide) having an intrinsic viscosity of 0.27 was stirred with one drop of a 50 percent aqueous sodium hydroxide solution and 10 mg. of TMAC for 30 minutes at 25° before addition of 2.1 ml. of polycarbonate similar to that described above, but having an average molecular weight of about 5,500 as determined by an active chlorine analysis of 0.13 meq./ml. After isolation, by the usual procedure of precipitation with methanol, the polymer had an intrinsic viscosity of 0.33.

EXAMPLE 6

This Example illustrates a variation in the procedure whereby a polymeric bis-chloroformate is used as a coupling agent. In this variation an excess of a bis-chloroformate of a simple dihydric phenol is reacted with a poly(phenylene oxide) to introduce a terminal chloroformate group on the polymer. A dihydric phenol is then added to react with the excess bis-chloroformate reagent as well as with the chloroformate terminal groups to produce a block copolymer whereby two molecules of the poly(phenylene oxide) are joined by one molecule of the polycarbonate. The procedure is similar to that of Example 4 except that 0.477 g. of the bis-chloroformate of 4,4'-isopropylidenediphenol (ca 9 molar excess) was used in place of the phosgene and the nitrogen sparge step was omitted. After 30 minuts, 0.185 g. of 4,4'-isopropylidenediphenol was added and after an additional 30 minutes the polymer was isolated in the usual fashion by methanol precipitation, washed and dried. There was obtained a yield of 2.4 g. of the block copolymer having an intrinsic viscosity of 0.38. From the molar ratio of about 2 of the poly(phenylene oxide) to 9 of bisphenol to 10 of the bis-chloroformate of the bisphenol, the calculated molecular weight for the polycarbonate block in the block copolymer is approximately 2,500, using a molecular weight of 10,000 for the poly(phenylene oxide).

An alternative route to the block copolymer involves using a procedure similar to the preceding one except instead of adding the 4,4'-isopropylidenediphenol in the second step, an alkali solution is added to hydrolyze some of the chloroformate groups to form phenoxide anions which then react with the remaining chloroformate groups to form carbonate linkages. Thus, 3.0 g. of poly(2,6-dimethyl-1,4-phenylene oxide) having an intrinsic viscosity of 0.26 was dissolved in 7 ml. of chlorobenzene and stirred with 0.015 g. of TMAC and 2 drops of a 50 percent aqueous sodium hydroxide solution containing 70 mg. of sodium hydroxide, for 30 minutes after which 0.61 g. of 4,4'-isopropylidenediphenol was added followed by 6 additional drops of 50 percent aqueous sodium hydroxide. The polymer was isolated in the usual fashion by precipitation with methanol. The yield was 3.5 g. and had an intrinsic viscosity of 0.34. The calculated molecular weight for the polycarbonate block in the block copolymer was approximately 3,000.

In a manner similar to that above, the other disclosed poly(phenylene oxides), e.g., poly(2-methyl-6-phenyl-1,4-phenylene oxide) and poly(2,6-diphenyl-1,4-phenylene oxide can be used in place of the poly(2,6-dimethyl-1,4-phenylene oxide) and other disclosed dihydric phenols and dihydric alcohols, per se, as their bis-chloroformates, or as their chloroformate terminated polycarbonates can be used in place of the 4,4'-isopropylidenediphenol, per se, as its bis-chloroformate, or as its chloroformate terminated polymeric carbonate. Likewise mixtures of one or more of the poly(phenylene oxides) and one or more of the bis-haloformates can be used.

As will be recognized by those skilled in the art, the actual determination of molecular weights and degree of polymerization is not extremely accurate, yet to obtain the highest molecular weights in the block copolymers requires precise stoichiometry. Although this might account for some of the above results not showing complete doubling of molecular weight, this is not the complete story since, of course, the coupling agent used has a profound effect on the solubility characteristics and therefore the osmotic methods used for determining molecular weights can be affected. This was illustrated in one case where gel permeation was used to check the change in molecular weight for the polymer and block copolymer from poly(2-methyl-6-phenyl-1,4-phenylene oxide). Osmotic molecular weight measurements showed a change in molecular weight of 15,000 for the starting polymer to 24,000 in the block copolymer. Gel permeation results showed a change in molecular weight of of 14,000 for the starting polymer to 29,000 in the block copolymer.

It is apparent from the above examples that a convenient way of increasing molecular weight to improve the physical properties of the polymers while maintaining the desirable characteristics of the low molecular weight polymer has been accomplished. As further illustration of this, a sample of one of the block copolymers having an intrinsic viscosity of 0.46 was molded under heat and pressure and found to undergo no change in intrinsic viscosity. A similar uncoupled poly(phenylene oxide) having an intrinsic viscosity of the same order would have increased during molding by 125 percent, showing the increased stability under heat of the block copolymers of this invention.

Although the above examples have illustrated many variations, other obvious variations may be made within the scope of this invention without departing from the scope as defined in the appended claims. For example, when a volatile coupling agent is used, e.g., phosgene, the solution of the poly(phenylene oxide) can be divided into two equal volumes. One volume of this polymer can be reacted with an excess of the coupling agent to insure complete reaction of all of the hydroxyl groups of the poly(phenylene oxide). The excess coupling agent is then removed and the other volume of polymer added thereafter. Precaution, of course, must be taken to guard against hydrolysis or side reactions of the intermediate reaction product prior to reacting with the second portion of the poly(phenylene oxide). Prior to molding or use, the polymers of this invention may be mixed with fillers, dyes, lubricants, and the usual compounding agents used with molding powders. The polymer may also be blended with other polymers compatible therewith, for example, polystyrene, polystyrene containing rubbers known as high-impact polystyrene, etc. These and others variations will be readily discernible to those skilled in the art and are within the full intended scope of the invention as defined by the appended claims.

What I claim as new and desire to secure by Letters Patent of the United States is:

1. A block copolymer having the formula

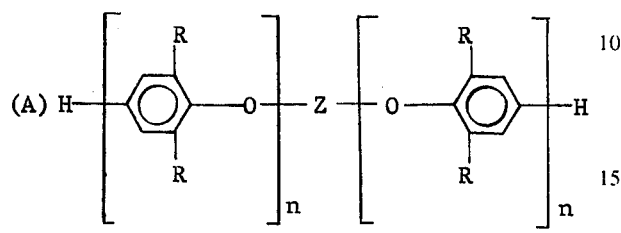

where each R is independently selected from the group consisting of methyl and phenyl and n is the average number of repeating units and is in the range of 40 to 170, and Z is a divalent segmer having the formula

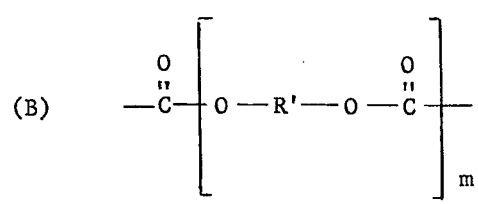

where R' is $C_{2-8}$ alkylene, phenylene, biphenylene, bis(phenylene)-$C_{1-8}$ alkane, bis(phenylene) oxide, poly($C_{2-8}$-oxyalkylene) having an average number of repeating units of from 2 to 10 or the aforementioned groups containing a phenylene or biphenylene group wherein from 1 up to the total number of hydrogens on the aryl rings are replaced by $C_{1-8}$ alkyl or halogen, and m represents the number of repeating units and is in the range of from 0 to 20.

2. The block copolymer of claim 1 which is a bis(polyphenylene oxide)carbonate.

3. The block copolymer of claim 1 wherein the carbonate moiety is the dicarbonate or polymeric carbonate of 4,4'-isopropylidenediphenol.

4. The block copolymer of claim 1 wherein the carbonate moiety is a polymeric carbonate of a dihydroxy compound.

5. The block copolymer of claim 4 wherein the dihydroxy compound is a phenol having each of the two phenolic hydroxyl groups on separate benzene rings.

6. The block copolymer of claim 1 wherein the carbonate moiety is a dicarbonate of a dihydric phenol.

7. The block copolymer of claim 1 wherein the poly(phenylene oxide) moiety is poly(2,6-dimethyl-1,4-phenylene oxide).

8. The block copolymer of claim 7 which is bis-[poly(2,6-dimethyl-1,4-phenylene oxide)] carbonate.

9. The block copolymer of claim 7 wherein the carbonate moiety is the dicarbonate of 4,4'-isopropylidenediphenol.

10. The block copolymer of claim 7 wherein the carbonate moiety is a polymeric carbonate of 4,4'-isopropylidenediphenol.

11. The process of making the block copolymers of claim 1 which comprises reacting:

a. a polyphenylene oxide having the formula

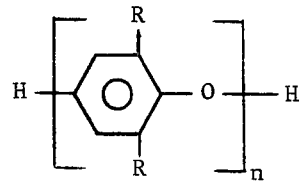

where R and n are as defined in claim 1, with b. a carbonyl halide having the formula

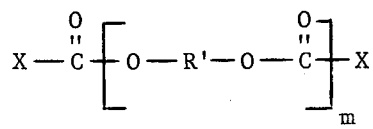

where X is halogen and R' and m are as defined in claim 1, in the presence of c. a hydrogen halide acceptor which is a concentrated aqueous solution of sodium hydroxide or potassium hydroxide.

12. The block copolymer of claim 1 wherein R' is $C_{2-8}$ alkylene, phenylene, biphenylene or the aforementioned groups containing a phenylene or biphenylene group wherein one up to the total number of aromatic hydrogens have been replaced by $C_{1-8}$ groups.

13. The block copolymer of claim 1 wherein n is in the range of from 0 to 1.

14. The block copolymer of claim 1 wherein n is 0.

15. The block copolymer of claim 1 wherein n is in the range of from 75 to 100.

16. The block copolymer of claim 15 wherein n is in the range of from 75 to 85.

17. The block copolymer of claim 1 wherein the poly(phenylene oxide) moiety is poly(2,6-diphenyl-1,4-phenylene oxide).

18. The block copolymer of claim 1 wherein the poly(phenylene oxide) moiety is prepared by the process of forming self-condensation products of phenols which comprises reacting oxygen with a phenol having the structural formula

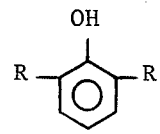

wherein each R is independently selected from the group consisting of methyl and phenyl, using as the oxygen-carrying intermediate a solution of an amine-basic cupric salt complex in which the phenol is soluble.

19. The block copolymer of claim 18 wherein the amine is a tertiary amine.

20. The block copolymer of claim 18 wherein the amine is selected from the group consisting of monoamines, diamines and triamines whose amine nitrogen atoms are directly bonded to an aliphatic carbon atom and at least one of said nitrogen atoms has at least one directly bonded hydrogen atom.

* * * * *

UNITED STATES PATENT OFFICE
CERTIFICATE OF CORRECTION

PATENT NO. : 3,875,256
DATED : April 1, 1975
INVENTOR(S) : Dwain M. White

It is certified that error appears in the above-identified patent and that said Letters Patent are hereby corrected as shown below:

Claim 13, line 30,    cancel "n" and substitute therefor
                               -- m --

Claim 14, line 32,    cancel "n" and substitute therefor
                               -- m --

Signed and sealed this 15th day of July 1975.

(SEAL)
Attest:

RUTH C. MASON
Attesting Officer

C. MARSHALL DANN
Commissioner of Patents
and Trademarks